United States Patent Office 3,065,125
Patented Nov. 20, 1962

---

3,065,125
ALKYNYL PHOSPHONOTHIOATES
Peter E. Newallis, Crestwood, and Joseph W. Baker and John P. Chupp, Kirkwood, Mo., assignors to Monsanto Chemical Company, St. Louis, Mo., a corporation of Delaware
No Drawing. Filed Jan. 28, 1960, Ser. No. 5,124
21 Claims. (Cl. 167—22)

This invention relates to new and useful phosphonothioates and to methods of making same. Additionally this invention relates to insecticidal compositions containing the new phosphonothioates as an active ingredient.

The new compounds of the invention can be termed alkynyl phosphonothioates and can be represented by the structure

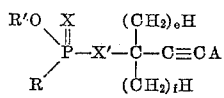

wherein R and R' are hydrocarbon radicals (e.g. phenyl, tolyl, cumyl, napthyl, benzyl, cyclohexyl, methylcyclohexyl, allyl, methyl, ethyl, n-propyl, isopropyl, n-butyl, isobutyl, isoamyl, heptyl, octyl, decyl, and the various aryl, alkaryl, aralkyl, cycloalkyl, alkenyl and alkyl isomeric forms thereof containing not more than 10 carbon atoms) but wherein not more than one of R and R' is an aromatic hydrocarbon radical; wherein $e$ and $f$ are integers from 0 to 1 inclusive; wherein X and X' are chalkogens of atomic weight less than 40 (i.e. sulfur or oxygen) but wherein at least one of X and X' is sulfur; and wherein A is hydrogen or methyl or halogen substituted methyl wherein the halogen substituent has an atomic number not higher than 35 (i.e. chlorine, bromine or fluorine), or

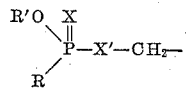

wherein R, R', X and X' have the aforedescribed significance, or

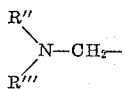

wherein R" and R'" are like or unlike aliphatic hydrocarbon radicals containing not more than 3 carbon atoms (i.e. methyl, ethyl, n-propyl, isopropyl, allyl, etc.).

Of the compounds of this invention a particularly useful group for insecticidal purposes are those of the foregoing structure wherein R and R' are like or unlike lower alkyl radicals, wherein X' is sulfur and wherein A is hydrogen, methyl or chloromethyl. These compounds can be represented by the struture

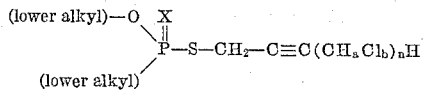

wherein X is a chalkogen of atomic weight less than 40 (i.e. sulfur or oxygen but preferably oxygen), wherein $n$ is an integer from 0 to 1, wherein $a$ is a number from 1 to 2, wherein $b$ is an integer from 0 to 1, and wherein the sum of $a$ and $b$ is 2. As illustrative of members of this class are O-methyl S-(2-propynyl) methylphosphonothioate
O-methyl S-(2-propynyl) isobutylphosphonothioate
O-ethyl S-(2-propynyl) methylphosphonothioate
O-isopropyl S-(2-propynyl) methylphosphonothioate
O-ethyl S-(2-butynyl) methylphosphonothioate
O-ethyl S-(2-butynyl) ethylphosphonothioate
O-ethyl S-(4-chloro-2-butynyl) ethylphosphonothioate
O-ethyl S-(2-propynyl) methylphosphonodithioate
O-ethyl S-(4-chloro-2-butynyl) methylphosphonodithioate
O-ethyl S-(4-chloro-2-butynyl) isobutylphosphonodithioate
O-isopropyl S-(2-butynyl) ethylphosphonodithioate These materials can be prepared by reacting a salt (e.g. the ammonium or alkali metal such as sodium, potassium, lithium salts) of an acid of the structure

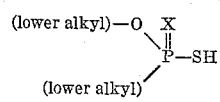

wherein X is a chalkogen of atomic weight less than 40 (i.e. sulfur or oxygen) in an anhydrous system with a substantially equimolar amount of a halide of the structure

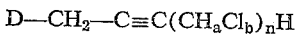

$$D—CH_2—C \equiv C(CH_aCl_b)_nH$$

wherein D is a halogen having an atomic number above 9 but not higher than 35, wherein $n$ is a number from 0 to 1, wherein $a$ is a number from 1 to 2, wherein $b$ is a number from 0 to 1, and wherein the sum of $a$ and $b$ is 2, in the presence of an inert organic liquid. As illustrative of suitable halide reactants are propargyl chloride, propargyl bromide, 1-chloro-2-butyne, 1-bromo-2-butyne and 1,4-dichloro-2-butyne. The preferred salt reactants are the ammonium salts of O-methyl methylphosphonothioic acid, O-methyl methylphosphonodithioic acid, O-ethyl methylphosphonothioic acid, O-ethyl methylphosphonodithioic acid, O-ethyl ethylphosphonothioic acid and O-ethyl ethylphosphonodithioic acid.

Another particularly useful group of compounds of this invention for insecticidal purposes are those of the structure

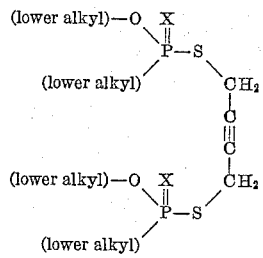

wherein the "lower alkyl" groups are like or unlike and wherein X is a chalkogen of atomic weight less than 40 (i.e. sulfur or oxygen). As illustrative of members of this group are S,S-(2-butyne-1,4-dithiol) bis-(O-ethyl methylphosphonothioate)
S,S-(2-butyne-1,4-dithiol) bis (O-ethyl methylphosphonodithioate)
S,S - (2 - butyne-1,4-dithiol) bis-(O-methyl methylphosphonothioate)
S,S - (2 - butyne-1,4-dithiol) bis-(O-methyl methylphosphonodithioate)
S,S - (2 - butyne-1,4-dithiol) bis-(O-ethyl ethylphosphonothioate)
S,S - (2 - butyne-1,4-dithiol) bis-(O-ethyl ethylphosphonodithioate)
S,S - (2 - butyne-1,4-dithiol) bis-(O-isopropyl methylphosphonothioate)
S,S - (2 - butyne-1,4-dithiol) bis-(O-isoamyl methylphosphonothioate)
S,S - (2 - butyne - 1,4-dithiol) O-ethyl methylphosphonothioate O-methyl ethylphosphonothioate These materials can be prepared by reacting 1,4-di-halo-2-butyne (e.g. 1,4-dichloro-2-butyne or 1,4-dibromo- 2-butyne) in an anhydrous system with a salt of an acid or mixture of acids of the structure

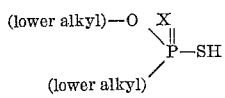

wherein X is a chalkogen of atomic weight less than 40 (i.e. sulfur or oxygen) in a molar ratio of substantially 1:2 in the presence of an inert organic liquid, the salts employed being the ammonium or alkali metal salts.

By the expression "lower alkyl" as used hereinbefore and in the appended claims unless otherwise modified is meant an alkyl radical containing from 1 to 5 carbon atoms as exemplified by methyl, ethyl, n-butyl, isobutyl, isoamyl and the various isomeric forms thereof. In general it is preferred that the lower alkyl substituent contain not more than two carbon atoms (i.e. methyl or ethyl).

As illustrative of other compounds of this invention is the following:

O-methyl O-(2-propynyl) methylphosphonothioate
O-ethyl O-(2-propynyl) methylphosphonothioate
O-ethyl O-(2-propynyl) phenylphosphonothioate
O-ethyl O-(2-propynyl) benzylphosphonothioate
O-ethyl S-(2-propynyl) isoamylphosphonothioate
O-ethyl S-(2-propynyl) cyclohexylphosphonothioate
O-cyclohexyl S-(2-propynyl) ethylphosphonothioate
O-allyl S-(2-propynyl) ethylphosphonothioate
O-phenyl S-(2-propynyl) ethylphosphonothioate
O-phenyl S-(4-chloro-2-butynyl) methylphosphonothioate
O-phenyl S-(4-chloro-2-butynyl) ethylphosphonothioate
O-phenyl S-(2-propynyl) ethylphosphonodithioate
O-(m-toly) S-(2-propynyl) ethylphosphonodithioate
O-ethyl S-(2-butynyl) cyclohexylphosphonodithioate
O-ethyl S-(1-methyl-2-propynyl) methylphosphonothioate
O-ethyl S-(1,1-dimethyl-2-propynyl) methylphosphonothioate
O-ethyl S-(4-bromo-2-butynyl) ethylphosphonothioate
S,S-(2-butyne-1,4-dithiol) bis-(O-ethyl phenylphosphonothioate)
S,S-(2-butyne-1,4-dithiol) bis-(O-methyl phenylphosphonodithiate)
S,S - (2 - butyne - 1,4-dithiol) bis-(O-phenyl methylphosphonothioate)
S,S - (2 - butyne-1,4-dithiol) bis-(O-ethyl cyclohexylphosphonothioate)
O-ethyl S-(4-dimethylamino-2-butynyl) phenylphosphonothioate
O-ethyl S-(4-dimethylamino-2-butynyl) phenylphosphonodithioate
O-ethyl O-(4-diallylamino-2-butynyl) methylphosphonothioate
O-methyl O-(4-diisopropylamino-2-butynyl) methylphosphonothioate In general the compounds of this invention are prepared by reacting in an anhydrous system a salt (e.g. ammonium or alkali metal such as sodium, potassium or lithium) of an acid of phosphorus of the structure

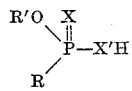

wherein R, R', X and X' have the aforedescribed significance with a halide of the structure

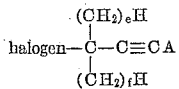

wherein A, e and f have the aforedescribed significance and wherein "halogen" means a halogen having an atomic number above 9 but not higher than 35 (i.e., chlorine or bromine, preferably chlorine) in the presence of an inert organic liquid or solvent (e.g. benzene, toluene, xylene, acetone, methyl ethyl ketone, etc.). The molar proportions of these reactants will vary depending upon the product desired. For the preparation of bis-(phosphonothioates) or mixed phosphonothioates substantially two molecular of the acid salt or mixture of acid salts are reacted with one molecular proportion of the 1,4-dihalogen-2-butyne reactant. A substantially equi-molecular proportion of the acid salt reactant is employed to replace one halogen substituent of the halide reactant in the preparation of a mono-phosphonothioate. While a wide range of reaction temperatures can be employed provided the system is fluid (i.e. the temperature of the system is maintained above the freezing point of the system and up to and including the boiling point of the system) it is preferred to employ a reaction temperature in the range of from about 20° C. to about 120° C. Any inert organic liquid or solvent can be used, for example, benzene, xylene, toluene, acetone, methyl ethyl ketone, carbon tetrachloride, etc.

The phosphonothionates of this invention can also be prepared by reacting in an anhydrous system a phosphonothionic halide of the structure

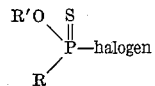

wherein R and R' have the aforedescribed significance and wherein the term "halogen" means a halogen having an atomic number above 9 but not higher than 35 (i.e. chlorine or bromine, preferably chlorine) with a hydroxy alkyne of the structure

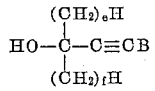

wherein e and f are like or unlike numbers from 0 to 1 and wherein B is a hydrogen, methyl or —CH$_2$OH, in the presence of an inert organic liquid or solvent (e.g. benzene, toluene, xylene, actone, methyl ethyl ketone, carbon tetrachloride, etc.) and a hydrogen halide scavenging agent (e.g. sodium carbonate, potassium carbonate, the tertiary organic amines such as triethyl amine, tributyl amine, dimethylaniline, lutidine, pyridine, etc.) in an amount sufficient to absorb the hydrogen halide by-product. In the preparation of a mono-phosphonothionate substantially equimolar proportions of the respective reactants will be employed. In the preparation of mixed phosphonothionates or bis-(phosphonothionates) substantially two molecular proportion of the phosphonothionic halide reactant or mixture of phosphonothionic halide reactants will be employed for each mol of the dihydroxy alkyne reactant. As illustrative of hydroxy alkyne reactants are propargly alcohol, 1-hydroxy butyne-2, 1,4-dihydroxy-butyne-2, and 1,1-dimethyl propargly alcohol.

As illustrative of the preparation of the compounds of this invention is the following:

*Example I*

To a suitable reaction vessel equipped with a thermometer, agitator, and reflux condenser is charged approximately 7.4 parts by weight (substantially 0.1 mol) of propargyl chloride, approximately 250 parts by weight of acetone, and approximately 19.05 parts by weight of ammonium O-ethyl methylphosphonodithioate. The mass is then heated at reflux for 4 hours. The reaction mass is then cooled to room temperature and filtered. The filter cake is then washed with acetone and the washings combined with the original filtrate. This liquid mass is then subjected to vacuum distillation to remove the acetone. The residue is then taken up with 75 parts by weight of methylene chloride and the solution washed first with 5% aqueous sodium carbonate and then washed twice with water and the washings discarded. The organic liquid mass is then stripped of the methylene chloride at a pot temperature of 100° C. at 7 mm. The residue, 18.6 parts by weight of a yellow oil, is O-ethyl S-(2-propynyl) methylphosphonodithioate which is soluble in benzene but insoluble in water. *Analysis.—*Theory 33% S. Found 32.6% S.

Employing the above procedure but replacing propargyl chloride with an equimolecular amount of 1-chloro-butyne-2 there is obtained O-ethyl S-(2-butynyl) methylphosphonodithioate which material is soluble in benzene and acetone, but insoluble in water.

Example II

To a suitable reaction vessel which is equipped with a thermometer, agitator and reflux condenser is charged approximately 8.3 parts by weight (substantially 0.07 mol) of propargyl bromide, approximately 75 parts by weight of acetone, and approximately 12.8 parts by weight (substantially 0.08 mol) of ammonium O-methyl methylphosphonodithioate. The mass is then heated with agitation at 60° C. for 4 hours. The reaction mass is then cooled to room temperature and filtered. The filter cake is then washed with acetone and the washings combined with the original filtrate. The organic liquid mass is then subjected to vacuum distillation to remove the acetone. The residue is then taken up with 75 parts by weight of methylene chloride and then washed first with 5% aqueous sodium carbonate and then twice with water and the washings discarded. The so-washed organic solution is then subjected to vacuum distillation to remove the solvent. The residue, 11.8 parts by weight of a light yellow oil, is O-methyl S-(2-propynyl) methylphosphonodithioate which is soluble in benzene but insoluble in water.

Employing the above procedure but replacing ammonium O-methyl methylphosphonodithioate with an equimolecular amount of sodium O-ethyl ethylphosphonothiolate there is obtained O-ethyl S-(2-propynyl) ethylphosphonothioate which material is soluble in acetone and benzene but insoluble in water.

Example III

To a suitable reaction vessel equipped with a thermometer, agitator and reflux condenser is charged approximately 80 parts by weight of acetone, approximately 36.9 parts by weight of 1,4-dichlorobutyne-2 and the mix heated with agitation to 35° C. Thereupon approximately 34.6 parts by weight of ammonium O-ethyl methylphosphonodithioate is added to the agitating mass over a period of 30 minutes. Thereafter the mass is heated at reflux for 4 hours. The reaction mass is then cooled to room temperature and filtered. The filter cake is then washed with acetone and the washings combined with the original filtrate. This organic liquid mass is then subjected to vacuum distillation to remove the volatiles. The residue is then taken up with 75 parts by weight of methylene chloride and then washed with three portions of water and the washings discarded. The so-washed organic solution is then stripped of solvent at a pot temperature of 110° C. at 3 mm. The residue, an amber oil, is O-ethyl S-(4-chloro-2-butynyl) methylphosphonodithioate which is soluble in benzene and acetone but insoluble in water. *Analysis.—*Theory 26.3% S. Found 26.7% S.

Employing the above procedure but replacing 1,4-dichlorobutyne-2 with an equimolecular amount of 1,4-dibromo-butyne-2 and replacing ammonium O-ethyl methylphosphonodithioate with an equimolecular amount of sodium O-isopropyl ethylphosphonothiolate there is obtained O-isopropyl S-(4-bromo-2-butynyl) ethylphosphonothioate, which material is soluble in benzene and acetone but insoluble in water.

Example IV

To a suitable reaction vessel equipped with a thermometer, agitator and reflux condenser is charged approximately 8.4 parts by weight of propargyl alcohol, approximately 15.1 parts by weight of triethyl amine and approximately 80 parts by weight of benzene. While agitating this mix 15.8 parts by weight of O-ethyl methylphosphonothioic chloride is added. The mix while agitating is heated at 60-70° C. for 6 hours, cooled to room temperature and filtered. The filter cake is then washed with benzene and the washings combined with the original filtrate. This liquid mass is then subjected to vacuum distillation to remove the benzene. The residue, a yellow liquid, is O-ethyl O-(2-propynyl) methylphosphonothioate which is soluble in acetone but insoluble in water. *Analysis.—*Theory 18.0% S. Found 18.2% S.

Employing the above procedure but replacing propargyl alcohol with one-half of an equimolecular amount of 1,4-dihydroxy-butyne-2 there is obtained O,O-(2-butyne-1,4-diol) bis-(O-ethyl methylphosphonothioate) which is soluble in acetone but insoluble in water.

Example V

To a suitable reaction vessel equipped with a thermometer, agitator and reflux condenser is charged approximately 80 parts by weight of acetone, approximately 4.52 parts by weight of propargyl bromide, and approximately 9.4 parts by weight of ammonium O-ethyl phenylphosphonodithioate. The mix is then heated at reflux for 4 hours, cooled to room temperature and filtered. The filtrate is then stripped of acetone under vacuum and the residue is then dissolved in methylene chloride and the solution washed first with 5% aqueous sodium carbonate and then with water and the washings discarded. The so-washed solution is then subjected to vacuum distillation to remove the solvent. The residue, 9.3 parts by weight of a yellow oil, is O-ethyl S-(2-propynyl) phenylphosphonodithioate which is insoluble in water. *Analysis.—*Theory 25% S. Found 24.8% S.

Employing the above procedure but replacing propargyl bromide with an equimolecular amount of 1,4-dichlorobutyne-2 there is obtained O-ethyl S-(1-chloro-2-butynyl) phenylphosphonodithioate which is soluble in acetone but insoluble in water.

Example VI

To a suitable reaction vessel equipped with a thermometer, agitator and reflux condenser is charged approximately 5.3 parts by weight of propargyl bromide, approximately 80 parts by weight of acetone and approximately 11.05 parts by weight of ammonium O-methyl phenylphosphonodithioate. The mix is heated at reflux for four hours, cooled to room temperature, and filtered. The filtrate is then subjected to vacuum distillation to remove the acetone. The residue is then taken up with methylene chloride and the solution washed first with 5% aqueous sodium carbonate and then with water. The so-washed organic solution is then subjected to vacuum distillation to remove the solvent. The residue, 10.4 parts by weight of a yellow oil, is O-methyl S-(2-propynyl) phenylphosphonodithioate which is soluble in benzene but insoluble in water. *Analysis.—*Theory 26.4% S. Found 25.8% S.

Employing the above procedure but replacing ammonium O-methyl phenylphosphonodithioate with an equimolecular amount of sodium O-methyl cyclohexylphosphonodithioate there is obtained O-methyl S-(2-propynyl) cyclohexylphosphonodithioate which is soluble in acetone but insoluble in water.

Example VII

To a suitable reaction vessel equipped with a thermometer, agitator and reflux condenser is charged 2.38 parts by weight of propargyl bromide, 16 parts by weight of acetone, and 3.45 parts by weight of ammonium O-ethyl methylphosphonothiolate. The mass is refluxed for one hour, cooled to room temperature and filtered. The filter cake is then washed with acetone and the washings combined with the original filtrate. This organic liquid mass is subjected to vacuum distillation to remove the acetone. The residue is then taken up with methylene chloride and the organic solution washed first with 5% aqueous sodium carbonate and then with water. The so-washed organic solution is then subjected to vacuum distillation to remove the solvent. The residue, 2.7 parts by weight of a dark red oil, is O-ethyl S-(2-propynyl) methylphosphonothioate which material is soluble in benzene but insoluble in water.

Employing the above procedure but replacing ammonium O-ethyl methylphosphonothiolate with an equimolecular amount of ammonium O-methyl methylphosphonothiolate there is obtained O-methyl S-(2-propynyl) methylphosphonothioate which is soluble in benzene but insoluble in water. Similarly O-ethyl S-(2-propynyl) ethylphosphonothioate is obtained by replacing ammonium O-ethyl methylphosphonothiolate with an equimolecular amount of ammonium O-ethyl ethylphosphonothiolate.

*Example VIII*

To a suitable reaction vessel equipped with a thermometer, agitator and reflux condenser is charged 14.7 parts by weight of 1,4-dichloro-butyne-2, and 80 parts by weight of acetone. To this mass while agitating is added 13.0 parts by weight of ammonium O-ethyl methylphosphonothiolate. The mass is then heated at reflux for 4 hours. The reaction mass is then cooled to room temperature and filtered. The filtrate is then subjected to vacuum distillation to remove the acetone and other volatiles. The residue is then taken up with methylene chloride and the organic solution washed first with 5% aqueous sodium carbonate and then with water. The so-washed organic solution is then subjected to vacuum distillation to remove the solvent. The residue, 12.5 parts by weight of an amber oil, is O-ethyl S-(4-chloro-2-butynyl) methylphosphonothioate which material is insoluble in water.

The above prepared product, i.e. O-ethyl S-(4-chloro-2-butynyl) methylphosphonothioate, upon dissolving in acetone and refluxing with a chemically equivalent amount of ammonium O-methyl ethylphosphonothiolate for about one hour, cooling, filtering and subjecting the filtrate to vacuum distillation to remove the acetone yields S,S-(2-butyne-1,4-dithiol) O-methyl ethylphosphonothioate O-ethyl methylphosphonothiate which material is insoluble in water.

*Example IX*

To a suitable reaction vessel equipped with a thermometer, agitator and reflux condenser is charged 15.8 parts by weight of O-ethyl methylphosphonothioic chloride, 4.3 parts by weight of 1,4-dihydroxy-butyne-2, 10.1 parts by weight of triethylamine and about 90 parts by weight of methyl ethyl ketone. The mass with agitation is heated at 70–75° C. for 5 hours, cooled to room temperature and filtered. The filtrate is then subjected to vacuum distillation to remove the acetone. The residue is then taken up with methylene chloride, and washed first with 5% sodium carbonate and then with water. The so-washed organic solution is then subjected to vacuum distillation to remove the solvent. The residue, an amber oil, is O,O-(2-butyne-1,4-diol) bis-(O-ethyl methylphosphonothioate) which is insoluble in water. *Analysis.*—Theory 19.4% S. Found 19.2% S.

Employing the above procedure but replacing O-ethyl methylphophonothioic chloride with an equimolecular amount of O-ethyl benzylphosphonothioic bromide there is obtained O,O-(2-butyne-1,4-diol) bis-(O-ethyl benzylphosphonothioate) which material is insoluble in water, but is soluble in acetone.

*Example X*

To a suitable reaction vessel equipped with a thermometer, agitator and reflux condenser is charged 80 parts by weight of acetone, 6.1 parts by weight of 1,4-dichloro-butyne-2 and 17.3 parts by weight of ammonium O-ethyl methylphosphonodithioate and the charge heated at reflux for 6 hours. The mass is then cooled to room temperature and filtered. The filtrate is then subjected to vacuum distillation to remove the acetone. The residue is taken up with methylene chloride and washed first with 5% aqueous sodium carbonate and then with water. The so-washed organic solution is then subjected to vacuum distillation to remove the solvent. The residue, an amber oil, is S,S-(2-butyne-1,4-dithiol) bis-(O-ethyl methylphosphonodithioate) which is soluble in benzene but insoluble in water.

Employing the above procedure but replacing ammonium O-ethyl methylphosphonodithioate with an equimolecular amount of ammonium O-ethyl isopropylphosphonothiolate there is obtained S,S-(2-butyne-1,4-dithiol) bis-(O-ethyl isopropylphosphonothioate) which is soluble in benzene but insoluble in water.

*Example XI*

To a suitable reaction vessel equipped with a thermometer, agitator and reflux condenser is charged approximately 12.7 parts by weight (0.05 mol) of O-ethyl S-(4-chloro-2-butynyl) methylphosphonodithioate, 80 parts by weight of benzene and approximately 8.0 parts by weight (0.11 mole) of diethylamine. The resulting mixture is refluxed for four hours, cooled to room temperature, quenched with water and the organic layer separated and washed successively with 3 percent aqueous sodium carbonate solution and water. The so-washed organic layer is then subjected to vacuum distillation to remove benzene. The residue, 10.2 parts by weight of amber oil, is O-ethyl S-(4-diethylamino-2-butynyl) methylphosphonodithioate.

Employing the above procedure but replacing diethylamine with an equimolecular amount of diallylamine there is obtained O-ethyl S-(4-diallylamino-2-butynyl) methylphosphonodithioate which material is insoluble in water.

*Example XII*

To a suitable reaction vessel equipped with a thermometer, agitator and reflux condenser is charged approximately 6.0 parts by weight (approximately 0.026 mole) of O-ethyl S-(4-chloro-2-butynyl) methylphosphonothioate, 80 parts by weight of benzene and 2.7 parts by weight of triethylamine. To this solution is added 2.0 parts by weight of diethylamine, and the resulting mixture refluxed for 5 hours. The reaction mass is cooled to room temperature, filtered and the filtrate washed successively with three portions of water. The so-washed benzene solution is then stripped of solvent to a pot temperature of 60° C. at 1 mm. to give 5.8 parts by weight of O-ethyl S-(4-diethylamino-2 - butynyl) methylphosphonothioate, an amber colored oil, which is insoluble in water.

In the processes of this invention any inert organic liquid or mixture of inert organic liquids can be used provided at least one of the reactants is soluble therein. The methods by which the phosphonothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for insecticidal purposes without further purification.

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection *h*, wherein the term "insect" is used to refer not only to those small invertebrate animals belonging mostly to the class Insecta, comprising six legged, usually winged forms, as beetles, bugs, bees, flies, and so forth, but also to other allied classes of arthropods whose members are wingless and usually have more than six legs, such as spiders, mites, ticks, centipedes, and wood lice.

The phosphonothioates of this invention are effective against a wide variety of insect pests. As illustrative of the activity but not limitative thereof is the following:

One gram of O-ethyl S-(2-propynyl) methylphosphonothioate was dissolved in sufficient acetone to make a concentrated solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.025% by weight of O-ethyl S-(2-propynyl) methylphosphonothioate. Thereupon lima bean plant leaves previously infested with the two-spotted spider mite, *Tetranychus telarius* (L.), are dipped in the aqueous emulsion, withdrawn, and set aside for observation. At the end of 48 hours a 100% kill of the moblie stages of the mite was noted. Seven days after setting the test specimens aside residual activity was confirmed, a 100% kill of both the resting stage and the ova stage being noted. Similar results against the mobile, resting, and ova stages of the same mite are obtained employing O-ethyl S-(2-propynyl) ethylphosphonothioate and O-methyl S-(2-propynyl) methylphosphonothioate.

One gram of S,S-(2-butyne-1,4-dithiol) bis-(O-ethyl methylphosphonodithioate) was dissolved in sufficient acetone to make a concentrated solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.0063% by weight of S,S-(2-butyne-1,4-dithiol) bis-(O-ethyl methylphosphonodithioate). Thereupon lima bean plant leaves previously infested with the two-spotted spider mite, *Tetranychus telarius* (L.), are dipped in the aqueous emulsion, withdrawn, and set aside for observation. At the end of 48 hours a 100% kill of the mobile stages of the mite was noted. Seven days after setting the test specimen aside residual activity was confirmed, a 100% kill of both the resting stage and the ova stage being noted. Employing the same test procedure against the mobile stage of the same mite a 100% kill was observed employing O-ethyl S-(2-propynyl) methylphosphonodithioate,
O-ethyl S-(2-propynyl) phenylphosphonodithioate, and
O-ethyl S-(4-chloro-2-butynyl) methylphosphonodithioate, respectively, at a concentration of 0.0063% by weight.

Employing O-ethyl S-(2-propynyl) methylphosphonothioate O-ethyl S-(2-propynyl) methylphosphonodithioate, O-ethyl S-(4-chloro-2-butynyl) methylphosphonodithioate and S,S-(2-butyne-1,4-dithiol) bis-(O-ethyl methylphosphonodithioate), respectively, at respective concentrations of 0.63 p.p.m., 0.31 p.p.m., 0.16 p.p.m. and 0.039 p.p.m. against yellow fever mosquito larvae, *Aedes aegypti*, 100% kill in each instance was observed.

Employing O-methyl S-(2-propynyl) phenylphosphonodithioate at a concentration of 0.063% by weight against the adult red flour beetle a 100% kill was observed.

Systemic activity was observed against a wide variety of insects. For example against the two-spotted spider mite, *Tetranychus telarius* (L.), a 100% kill was observed employing O-ethyl S-(2-propynyl) methylphosphonothioate at a concentration of 0.00025% by weight. And for example against the adult bean beetle a 100% kill was observed employing O-methyl S-(2-propynyl) phenylphosphonodithioate and O-ethyl S-(4-diethylamino-2-butynyl) methylphosphonothioate, respectively, at a concentration of 0.004% by weight.

Although the phosphonothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphonothioates of this invention are dispersed, it means that particles of the phosphonothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form. e.g., pellets, granules, powders, or dusts. The term "dispersed" also includes mixtures which are suitable for use as aerosols including solutions, suspensions, or emulsions of the phosphonothioates of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the phosphonothioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphonothioates of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g. as in solutions, suspensions, emulsions or aerosols) the concentration of the phosphonothioate employed to supply the desired dosage generally will be in the range of 0.001 to 50 percent by weight. When the extending agent is a semi-solid or solid, the concentration of the phosphonothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared insecticidal spray or particulate solid. In such a concentrate composition, the phosphonothioate generally will be present in a concentration of 5 to 95 percent by weight, the residue being any one or more of the well-known insecticidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions or emulsions of the phosphonothioates of this invention. For example isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphonothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphonothioates of this invention are preferably supplied to the insect pests or to the environment of the insect pests in the form of emulsions or suspensions. Emulsions or suspensions are prepared by dispersing the phophonothioates of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents." "wetting agents" and "spreading agents' that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphonothioates of this invention can be dispersed by suitable methods (e.g. tumbling or grinding) in solid extending agents either of organic or inorganic nature and supplied to the insect pest environment in particulate form. Such solid materials include, for example, tricalcium phosphate, calcium carbonate, kaolin, bole, kieselguhr, talc, bentonite, fullers earth, pyrophillite, diatomaceous earth, calcined magnesia, volcanic ash, sulfur and the like inorganic solid materials, and include, for example, such materials of orangic nature as powdered cork, powdered wood, and powdered walnut shells. The preferred solid carriers are the adsorbent clays, e.g. bentonite. These mixtures can be used for insecticidal purposes in the dry form or, by addition of water-soluble surfactants or wetting agents the dry particulate solids can be rendered wettable by water so as to obtain stable aqueous dispersions or suspensions suitable for use as sprays.

For special purposes the phosphonothioates of this invention can be dispersed in a semi-solid extending agent such as petrolatum or soap (e.g., sodium stearate or oleate or palmitate or mixtures thereof) with or without the aid of solubility promotors and/or sufactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphonothioate of this invention with a water-soluble surfactant which lowers the surface tension of water in the weight proportions of 0.1 to 15 parts of surfactant with sufficient of the phosphonothioate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of O-ethyl S-(2-propynyl) methylphosphonothioate and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a phosphonothioate of this invention in an organic solvent therefor. The said liquid concentrate preferably contains dissolved therein a minor amount (e.g. 0.5 to 10 percent by weight of the weight of the new insecticidal agent) of a surfactant (or emulsifying agent) which surfactant is also water-soluble. As illustrative of such a concentrate is a solution of S,S-(2-butyne-1,4-dithiol) bis-(O-ethyl methylphosphonodithioate) in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkylaryl sulfonates such as sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan.

In all of the various dispersions described hereinbefore for insecticidal purposes, the active ingredient can be one or more of the compounds of this invention.. The compounds of this invention can also be advantageously employed in combination with other pesticides, including, for example, nematocides, fungicides, bactericides and herbicides. In this manner it is possible to obtain mixtures which are effective against a wide variety of pests and other forms of obnoxious life.

In controlling or combatting insect pests the phosphonothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the inset pests frequent, e.g. agricultural soil or other growth media or other media infested with the insect pests or attractable to the pests for habitational or sustenance or propagational purposes, in any conventional fashion which permits contact between the insect pests and the phosphonothioates of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the inset pests frequent, or by employing a liquid carrier for the new insecticidal agent to accomplish sub-surface penetration and impregnation thereof therein.

While this invention has been described with respect to certain embodiments, it is to be understood that it is not so limited and that variations and modifications thereof obvious to those skilled in the art can be made without departing from the spirit or scope thereof.

What is claimed is:

1. Alkynyl phosphonothioates of the structure,

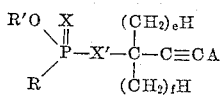

wherein R and R' are hydrocarbon radicals containing not more than 10 carbon atoms and are selected from the group consisting of aryl, alkaryl, aralkyl, cycloalkyl, alkenyl and alkyl radicals but wherein not more than one of R and R' is an aromatic hydrocarbon radical; wherein X and X' are chalkogens of atomic weight less than 40 but wherein at least one of X and X' is sulfur; wherein $e$ and $f$ are integers from 0 to 1, inclusive; and wherein A is selected from the group consisting of hydrogen, methyl, halogen-substituted methyl wherein the halogen has an atomic number not higher than 35,

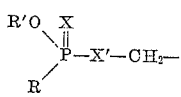

wherein R, R', X and X' have the aforementioned significance, and

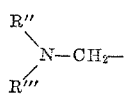

wherein R'' and R''' are aliphatic hydrocarbon radicals containing not more than 3 carbon atoms and are selected from the group consisting of alkyl and alkenyl radicals.

2. Alkynyl phosphonothioates of the structure

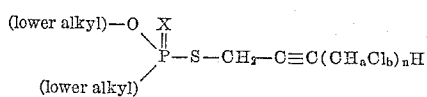

wherein X is a chalkogen of atomic weight less than 40, wherein $n$ is an integer from 0 to 1; wherein $a$ is a number from 1 to 2; wherein $b$ is an integer from 0 to 1; and wherein the sum of $a$ and $b$ is 2.

3. Alkynyl phosphonothioates of the structure

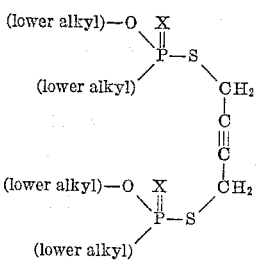
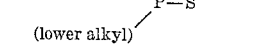

wherein X is a chalkogen of atomic weight less than 40.

4. O-ethyl S-(2-propynyl) methylphosphonodithioate.
5. O-methyl S-(2-propynyl) methylphosphonodithioate.
6. O-ethyl S-(2-propynyl) methylphosphonothioate.
7. S,S,(2-butyne-1,4-dithiol) bis (O-ethyl methylphosphonodithioate).
8. An insecticidal composition comprising a compound of claim 1 dispersed in an extending agent.
9. An insecticidal composition comprising a compound of claim 1 dispersed in a semi-solid extending agent, the composition containing 0.1 to 25 percent by weight of said compound of claim 1.
10. An insecticidal composition comprising a compound of claim 1 dispersed in a solid extending agent, the composition containing 0.1 to 25 percent by weight of said compound of claim 1.
11. An insecticidal composition comprising a compound of claim 1 dispersed in a liquid extending agent, the composition containing 0.001 to 50 percent by weight of said compound of claim 1.
12. An insecticidal composition comprising a compound of claim 2 dispersed in an adsorbent clay, the composition containing 0.1 to 25 percent by weight of said compound of claim 2.
13. An insecticidal concentrate comprising a compound of claim 2 and an insecticidal adjuvant, said concentrate containing from 5 to 95 percent by weight of the compound of claim 2.
14. An insecticidal concentrate comprising a compound of claim 2 dispersed in an organic solvent therefor and having dissolved therein a minor amount of a surfactant, said concentrate forming an emulsion with water upon agitation therewith.
15. An insecticidal concentrate adapted to be made into a sprayable composition by the addition of water comprising a compound of claim 1 in admixture with a water-soluble surfactant in the weight proportion of 0.1 to 15 parts of surfactant and sufficient of said compound of claim 1 to make 100 parts by weight.
16. The method of controlling insects which comprises contacting the insects with a toxic amount of a compound of claim 1.
17. The method of controlling insects which comprises contacting the insects with a toxic amount of compound of claim 2.
18. The method of making the compounds of the structure

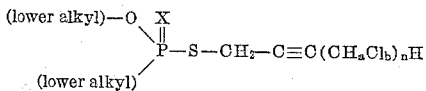

wherein X is a chalkogen of atomic weight less than 40, wherein $n$ is an integer from 0 to 1, wherein $a$ is a whole number from 1 to 2, wherein $b$ is an integer from 0 to 1, and wherein the sum of $a$ and $b$ is 2 which comprises reacting an ammonium salt of an acid of the structure

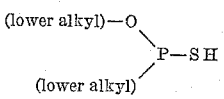

wherein X is a chalkogen of atomic weight less than 40 in an anhydrous system with a substantially equimolar amount of a halide of the structure $$D-CH_2-C\equiv C(CH_aCl_b)_nH$$

wherein D is a halogen having an atomic number above 9 but not higher than 35, wherein $n$ is an integer from 0 to 1, wherein $a$ is a number from 1 to 2, wherein $b$ is an integer from 0 to 1, and wherein the sum of $a$ and $b$ is 2, in the presence of an inert organic liquid.

19. The method of making the compounds of the structure

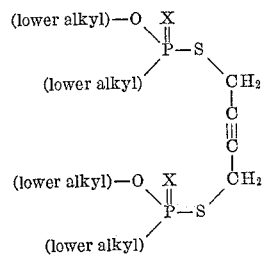

wherein X is a chalkogen of atomic weight less than 40 which comprises reacting 1,4-dichlorobutyne-2 in an anhydrous system with an ammonium salt of an acid of the structure,

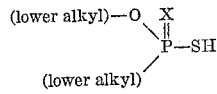

wherein X is a chalkogen of atomic weight less than 40 in a molar ratio of substantially 1:2 in the presence of an inert organic liquid.

20. The method of making compounds of claim 1 which comprises reacting under anhydrous conditions a salt of an acid of phosphorus of the structure

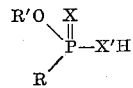

wherein R', R, X and X' have the same significance as in claim 1 with a halide of the structure

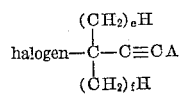

wherein A, $e$ and $f$ have the same significance as in claim 1, and wherein "halogen" means a halogen having an atomic number above 9 but not higher than 35, said salt being selected from the group consisting of ammonium and alkali metal salts.

21. The method of making phosphonothioates of claim 1 wherein X is sulfur and wherein X' is oxygen which comprises reacting in an anhydrous medium a hydroxy alkyne of the structure

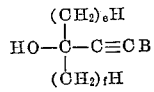

wherein B is selected from the group consisting of hydrogen, methyl, and hydroxymethyl, and wherein $e$ and $f$ are integers from 0 to 1, with an acid halide of the structure

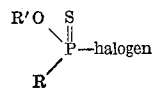

wherein R and R' are hydrocarbon radicals containing not more than 10 carbon atoms and are selected from the group consisting of aryl, alkaryl, aralkyl, cycloalkyl, alkenyl and alkyl radicals but wherein not more than one of R and R' is an aromatic hydrocarbon radical, and wherein "halogen" means a halogen having an atomic number above 9 but not higher than 35, in the presence of a hydrogen halide scavenging agent in an amount at least sufficient to absorb the hydrogen halide by-product.

References Cited in the file of this patent

UNITED STATES PATENTS

| | | |
|---|---|---|
| 2,266,514 | Romieux | Dec. 16, 1941 |
| 2,531,129 | Hook | Nov. 21, 1950 |
| 2,841,520 | Willard | July 1, 1958 |
| 2,865,801 | Baker | Dec. 23, 1958 |
| 2,885,430 | Scherer | May 5, 1959 |
| 2,906,661 | Baker | Sept. 29, 1959 |
| 2,909,559 | Lanham | Oct. 20, 1959 |
| 2,911,335 | Gilbert | Nov. 3, 1959 |
| 2,920,993 | Fairchild | Jan. 12, 1960 |
| 2,960,429 | Baker | Nov. 15, 1960 |